US012748859B2

(12) United States Patent
Sekar et al.

(10) Patent No.: US 12,748,859 B2
(45) Date of Patent: Sep. 29, 2026

(54) CONTEXT-AWARE VULNERABILITY PRIORITIZATION

(71) Applicant: Ordr Inc., Santa Clara, CA (US)

(72) Inventors: Sakthi Dasan Sekar, Chennai (IN); Gnanaprakasam Pandian, Cupertino, CA (US); Deepak Cherian, Newark, CA (US)

(73) Assignee: Ordr Inc., Santa Clara, CA (US)

( * ) Notice: Subject to any disclaimer, the term of this patent is extended or adjusted under 35 U.S.C. 154(b) by 0 days.

(21) Appl. No.: 18/897,747

(22) Filed: Sep. 26, 2024

(65) Prior Publication Data

US 2026/0087145 A1 Mar. 26, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

2013/0031634 A1* 1/2013 McClure ............... G06F 21/552 726/25
2020/0162497 A1* 5/2020 Iyer ....................... H04L 63/164
2021/0065415 A1* 3/2021 Stetson ................. G06F 40/137
2021/0211450 A1* 7/2021 Aleidan .............. H04L 63/1416
2022/0269743 A1* 8/2022 Balasubramanian ........................ G06F 16/9538
2024/0187311 A1* 6/2024 Nodzak ............... H04L 41/0681
2024/0205300 A1* 6/2024 Kim .................... H04L 63/0846

OTHER PUBLICATIONS

Manning; Christopher et al. "Matrix Decompositions and Latent Semantic Indexing" [online] Stanford, 2009 [Retrieved Jan. 6, 2026]. Retrieved from the Internet: URL: https://nlp.stanford.edu/IR-book/pdf/18lsi.pdf (Year: 2009).*
Zand; Ali et al. "Rippler: Delay Injection for Service Dependency Detection" [online] Seclab, Jul. 8, 2014 [Retrieved Jan. 6, 2026]. Retrieved from the Internet: URL: https://seclab.cs.ucsb.edu/files/publications/Zand2014Rippler_Delay.pdf (Year: 2014).*

* cited by examiner

*Primary Examiner* — Taghi T Arani
*Assistant Examiner* — Joshua Raymond White
(74) *Attorney, Agent, or Firm* — Invoke

(57) ABSTRACT

A system identifies a target device within a network and monitors interactions between a support device and the target device. Based on the monitored interactions, the system generates a support score for the support device, representing its contribution to the functionality of the target device. The system prioritizes a remediation action corresponding to the support device based at least in part on the support score for the support device.

20 Claims, 5 Drawing Sheets

CONTEXT-AWARE VULNERABILITY PRIORITIZATION

TECHNICAL FIELD

The present disclosure relates to risk analysis for computer networks.

BACKGROUND

Vulnerability management systems identify, evaluate, and address security weaknesses in organizational networks. These systems employ automated scanners to detect vulnerabilities across endpoints, comparing device configurations against databases of known security flaws. Discovered vulnerabilities undergo evaluation based on severity scores, exploitability, potential business impacts, and existing security measures. The systems assign risk scores to vulnerabilities, considering factors such as the criticality of affected assets. Based on these assessments, vulnerability management systems prioritize remediation actions, recommending strategies that range from patching and code correction to implementing mitigations or accepting risks when appropriate. Through this process, organizations reduce their exposure to potential cyber threats and enhance their overall security.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
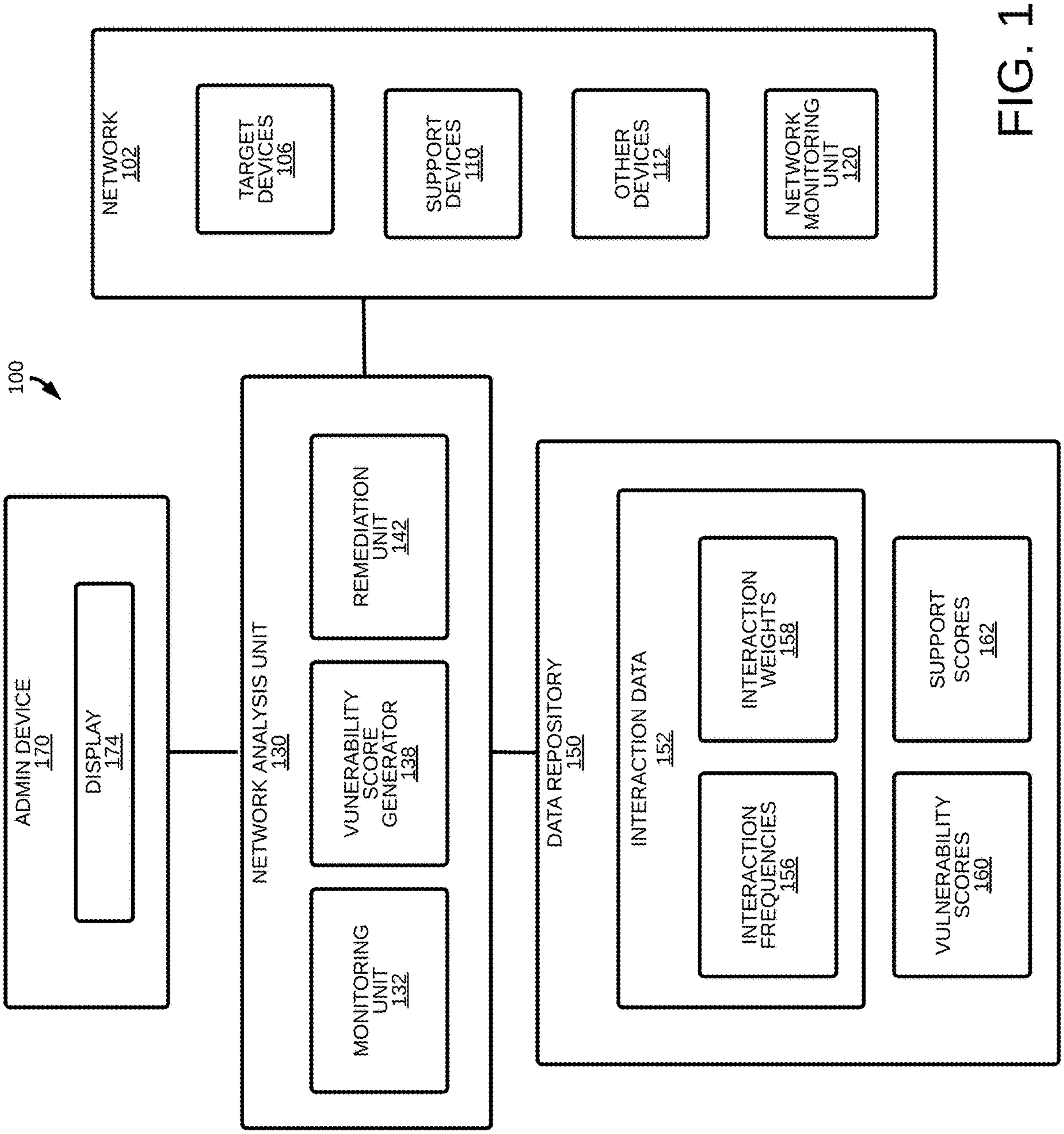
FIG. 1 illustrates a system for support device identification and vulnerability score adjustment in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present embodiment.

1. GENERAL OVERVIEW
2. SUPPORT DEVICE IDENTIFICATION SYSTEM
3. VULNERABILITY SCORE ADJUSTMENT OF SUPPORT DEVICES BASED ON INTERACTIONS WITH TARGET DEVICES IN A NETWORK
4. NETWORK GRAPH FOR BEAM SEARCH
5. PRACTICAL APPLICATIONS, ADVANTAGES, & IMPROVEMENTS
6. MISCELLANEOUS; EXTENSIONS
7. HARDWARE OVERVIEW

1. General Overview

One or more embodiments prioritize remediation actions for a support device based on a current role of the support device in supporting a target device as determined by real-time analysis. The system identifies target devices, such as business-critical devices, in a network and subsequently identifies support devices that contribute to the operation of these target devices. The system analyzes communication patterns between devices in the network, allowing for a comprehensive understanding of device relationships and dependencies.

One or more embodiments produce a support score for identified support devices. The support score quantifies the contribution of the support device to the target device's operation. The support score enables the system to prioritize remediation actions corresponding to the support device more effectively. By focusing on support devices that significantly impact critical systems, the system enhances overall network security and resilience.

One or more embodiments assign weights to different types of monitored interactions between the support device and the target device. The system then tracks the frequencies of these different types of interactions. The system combines the weights and the frequencies to produce support scores. In an embodiment, the system adjusts the support score based on other factors that link a support device to a target device.

One or more embodiments adjust initial vulnerability scores for support devices based on their calculated support scores. The system produces the initial vulnerability scores without considering the interactions between support devices and target devices of the network. The systems adjustment of the initial vulnerability scores for support devices ensures that vulnerability assessments take into account the contextual importance of support devices within the network infrastructure. The system then increases vulnerability remediation actions for some support devices using these adjusted vulnerability scores. By doing so, the system enables organizations to focus their security efforts on addressing vulnerabilities that pose the greatest risk to target network operations.

One or more embodiments enhance support score calculations with additional factors. Exemplary factors include correlated active/idle times of the support device and the target device, frequency of changes and patches, sensitive data handling or privileged access, high resource usage patterns, and frequency of audits or compliance requirements. Example systems apply machine learning models to historical data to detect correlations between support devices and target devices.

One or more embodiments use beam search by constructing a hierarchical tree structure to represent the network's device relationships. A target device is represented by the root node with directly interacting support devices as child nodes and indirectly interacting devices as further descendants. The system scores candidate support devices by performing a beam search traversal of this tree structure.

One or more embodiments apply latent semantic analysis to organizational data sources. The system associates devices with terms in these sources, constructs a term-device matrix, and applies singular value decomposition to uncover underlying relationships among devices. This latent semantic analysis helps the system categorize devices as target and/or support devices.

One or more embodiments described in this Specification and/or recited in the claims may not be included in this General Overview section.

2. Support Device Identification System

FIG. 1 illustrates a system for support device identification and vulnerability score adjustment in accordance with one or more embodiments. System 100 includes network monitoring unit 120, network analysis unit 130, monitoring unit 132, vulnerability score generator 138, remediation unit 142, data repository 150, and admin device 170. In one or more embodiments, system 100 may include more components or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

In accordance with an embodiment, network 102 connects multiple computing devices to facilitate communication and resource sharing. Network 102 comprises various hardware components, including routers, switches, and infrastructure. Computing devices on the network exchange data packets through defined protocols, enabling information transfer. In accordance with an embodiment, network 102 includes devices that are categorized as target devices 106, support devices 110, and other devices 112 as described below.

In accordance with an embodiment, devices operate as nodes within network 102. Devices connect to other network devices through wired or wireless interfaces. Devices process and transmit data packets according to network protocols. Components of devices include a processor, memory, and a network interface card. In one example, devices are any type of electronic computing apparatus, such as a phone, laptop, or desktop.

In accordance with an embodiment, network monitoring unit 120 observes and analyzes network activity at the network. Network monitoring unit 120 collects data on performance metrics, identifying potential issues and anomalies. System 100 uses monitoring data to optimize network operations and maintain a secure environment. Network monitoring unit 120 observes and analyzes network traffic and infrastructure components. Network monitoring unit 120 collects data from various network devices through protocols such as Simple Network Management Protocol (SNMP). Network monitoring unit 120 processes collected information to generate performance metrics and status reports.

In accordance with an embodiment, network analysis unit 130 examines the network 102 structure and performance. As described below, network analysis unit 130 includes a number of units including monitoring unit 132, vulnerability score generator 138, and remediation unit 142.

In accordance with an embodiment, monitoring unit 132 continuously observes and records interactions between devices in the network. The monitoring unit 132 captures real-time data on network traffic, communication patterns, and data flows. Through its ongoing surveillance, the monitoring unit 132 provides a dynamic view of the network's operational state and helps identify potential security issues.

In accordance with an embodiment, vulnerability score generator 138 calculates and assigns risk scores to devices based on various factors. Vulnerability score generator 138 considers known vulnerabilities, patch status, exposure to potential threats, and the device's importance in the network ecosystem. By generating these scores, vulnerability score generator 138 enables prioritization of security efforts and resource allocation across the network.

In accordance with an embodiment, network analysis unit 130 assigns interaction weights 158 to different interaction types between support devices 110 and target devices 106. Network analysis unit 130 tracks interaction frequencies 156 of the types of interactions and determines support scores 162 based on interaction weights 158 and interaction frequencies 156.

In one embodiment, vulnerability score generator 138 adjusts an initial vulnerability score for one or more of support devices 110 based on the importance of a link between the support device and one or more of target devices 106. Vulnerability score generator 138 adjusts vulnerability scores 160 for one or more of support devices 110 using support scores 162.

In accordance with an embodiment, interaction data 152 stored in data repository 150 comprises records of communications and data exchanges between devices. The interaction data 152 includes information, such as source and destination devices, types of data transferred, and timestamps of interactions. Interaction data 152 serves as the foundation for analyzing device relationships and network dynamics.

In accordance with an embodiment, interaction weights 158 in data repository 150 assign relative importance to different types of device interactions. The interaction weights 158 reflect the importance of various communication types to the overall network operation. By applying these weights, the system more accurately assesses the significance of device relationships and their potential impact on network security.

In accordance with an embodiment, interaction data 152 includes interaction frequencies 156 that quantify how often specific types of interactions occur between devices. The interaction frequencies 156 provide a measure of the intensity and consistency of relationships between devices. This data helps in assessing the relative importance of different device interactions and their impacts on network functionality.

In accordance with an embodiment, support scores 162 in data repository 150 quantify the contribution of devices to the functionality of target devices. In an example, vulnerability score generator 138 derives support scores 162 from an analysis of device interactions, communication patterns, and the relative importance of different devices. These scores guide the prioritization of security measures and operational decisions to maintain network integrity and performance.

In accordance with an embodiment, vulnerability scores 160 stored in data repository 150 represent the assessed risk level for devices in the network. The vulnerability scores 160 incorporate various factors, such as known vulnerabilities, patch status, and exposure to threats. These scores serve as a key input for prioritizing security efforts and resource allocation across the network. In accordance with an embodiment, remediation unit 142 implements security measures based on the analyzed data and calculated scores. The remediation unit 142 executes remediation actions, such as patching vulnerabilities, adjusting device configurations, or increasing monitoring on high-risk devices. In one example, remediation unit 142 remediates one or more of the support devices 110 based on the adjusted vulnerability scores for these one or more of the support devices 110. In one embodiment, remediation unit 142 implements a security policy such as restricting access to the device to specific users and software.

In accordance with an embodiment, admin device 170 interfaces with network analysis unit 130. Admin device 170 uses display 174 to display various network statistics, device relationships, and security metrics. The display 174 presents a visual representation of the network topology, highlighting target devices and their support relationships. Display 174 shows vulnerability scores for devices, allowing administrators to quickly identify high-risk devices. The display 174 also provides interactive features, enabling administrators to view specific device details, view historical trends of support scores, and access real-time alerts for potential security issues. Through this comprehensive visual interface, admin device 170 empowers network administrators to make informed decisions about resource allocation, security policy adjustments, and remediation priorities.

In one or more embodiments, data repository 150 stores the data and configuration of system 100. Data repository 150 is any type of storage unit and/or device (e.g., a file system, database, collection of tables, or any other storage mechanism) for storing data. Furthermore, data repository 150 includes a single or multiple different storage units and/or devices. The multiple different storage units and/or devices may or may not be of the same type or located at the same physical site. Data repository 150 is implemented or executed on the same computing system or different computing system as system 100.

Figure 2A:
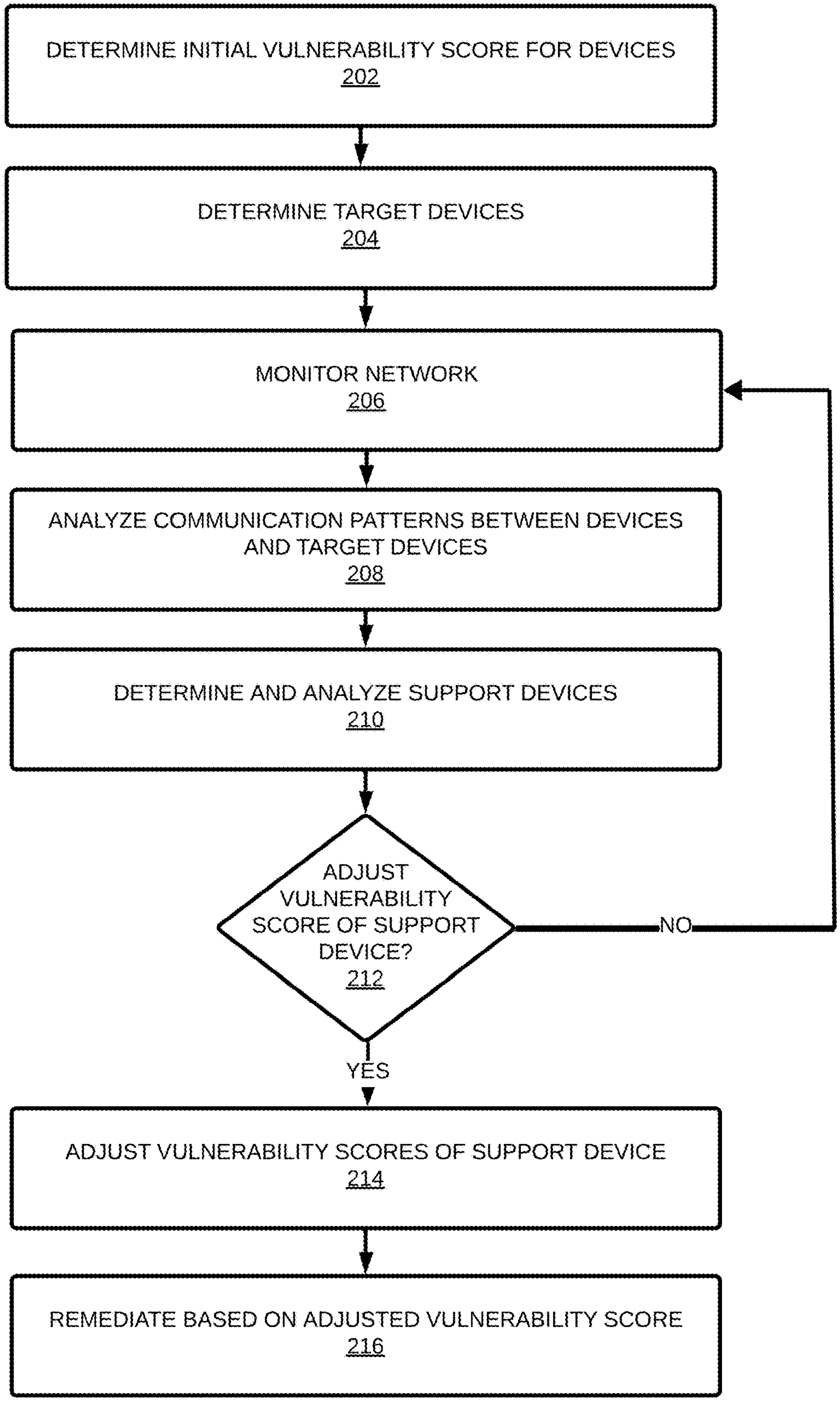
FIG. 2A illustrates an example set of operations for vulnerability score adjustment of support devices based on interactions with target devices in a network in accordance with one or more embodiments.

3. Vulnerability Score Adjustment of Support Devices Based on Interactions with Target Devices in a Network FIG. 2A illustrates an example set of operations for vulnerability score adjustment of support devices based on interactions with target devices in a network in accordance with one or more embodiments. Some of the example set of operations described below specifically describe a vulnerability score adjustment. However, a similar or modified set of operations may be executed for any risk vulnerability score adjustment. One or more operations illustrated in FIG. 2A may be modified, rearranged, or omitted. Accordingly, the particular sequence of operations illustrated in FIG. 2A should not be construed as limiting the scope of one or more embodiments.

In an embodiment, a system determines initial vulnerability scores for devices in a network (Operation 202). The system evaluates various factors, such as known vulnerabilities, patch status, and exposure to potential threats to establish an initial vulnerability score for a device. These initial scores serve as a starting point for more nuanced analysis and prioritization of security efforts across the network using the support scores as discussed below.

In one embodiment, the system uses the Common Vulnerability Scoring System (CVSS) when determining vulnerability scores. CVSS provides a standardized method for assessing the severity of vulnerabilities, taking into account numerous factors, such as attack complexity, required privileges, and potential impact on confidentiality, integrity, and availability. By incorporating CVSS scores, the system ensures alignment with industry-standard vulnerability assessment practices.

In one embodiment, exemplary vulnerability scores are categorized as high, medium, or low, providing a quick assessment of the risk level associated with devices. High vulnerability scores indicate critical security issues that require immediate attention; medium scores suggest moderate risks that should be addressed in due course; and low scores represent minimal security concerns.

In one embodiment, the system utilizes a numeric vulnerability scoring system, such as ranging from 0 to 10, where 0 represents no known vulnerabilities and 10 indicates the highest level of risk. This numeric approach allows for more granular differentiation between vulnerability levels and facilitates precise prioritization. For instance, a score of 9.5 might represent a critical vulnerability with known exploits in the wild, while a score of 2.1 could indicate a low-risk vulnerability with limited potential for exploitation.

In an embodiment, a system determines target devices within a network (Operation 204). The system identifies target devices, such as business-critical servers, based on user input € 8 or association with key products. In one example, the system scans the network infrastructure to identify critical components that are essential for core business operations. Target devices are typically servers, databases, or key network nodes that play a vital role in maintaining business continuity. For example, the system identifies certain specialized medical equipment, such as CT scan machines, as target devices within a healthcare network infrastructure by recognizing the importance of CT scan machines in diagnostic processes and patient care workflows.

In an embodiment, the system employs various methods to ascertain the criticality of target devices, including analysis of network traffic patterns, user access frequency, and data flow importance. Additionally, the system considers user-defined inputs and organizational knowledge to refine its identification of target devices.

In an embodiment, the system utilizes machine learning algorithms to automatically identify target devices crucial for network operations. The system trains the machine learning model on historical network data, including traffic patterns, system logs, and performance metrics. As the model processes new data, the machine learning model recognizes patterns indicative of target devices, such as high traffic volume, frequent data access, or consistent uptime. In one example, the system continuously refines identification accuracy through ongoing learning, adapting to changes in network topology and usage patterns over time.

In an embodiment, the system incorporates administrator input as an alternate or supplemental method of identifying target devices or to supplement the automated target device identification process. Network administrators possess valuable insights into the organization's infrastructure and operational requirements. In one example, the system provides an interface for administrators to manually designate target devices, override automated classifications, or adjust the criticality level of identified targets.

In an embodiment, the system monitors the network to gather real-time data on device interactions and behaviors (Operation 206). The system continuously observes network traffic, communication patterns, and data flows between devices. This ongoing monitoring provides a dynamic view of the network's operational state and helps identify potential security risks. The monitoring is real-time in that the system processes incoming data streams instantaneously, enabling immediate detection of anomalies or changes in device behavior.

In an embodiment, the system analyzes communication patterns between devices and target devices (Operation 208). Target devices, such as critical servers, are recognized as relying on other machines and tools for proper operation, termed 'support devices'. The system analyzes communication patterns, looking for devices that frequently interact with critical servers. In one example, the system examines the frequency, duration, and nature of interactions between support devices and critical target devices. By understanding these communication patterns, the system gains insights into the dependencies and relationships between devices; this informs the assessment of devices' relative importance to network operations.

In an embodiment, the system assigns devices to a "current role" within the network. The system dynamically assigns and updates current roles to devices based on their real-time interactions, functionalities, and importance within the network. The system categorizes devices into three primary roles: support devices, target devices, and/or neither. Support devices are identified by the system as those that provide critical services or resources to target devices, while target devices are recognized as key assets that are essential for core business operations. The system continuously evaluates device behaviors, communication patterns, and resource utilization to determine the most appropriate role classification at any given moment.

In an embodiment, the system employs a flexible role assignment mechanism that allows devices to transition between roles based on changing network conditions and operational requirements. The system monitors device activities and network topology changes in real-time, promptly updating role classifications when significant shifts are detected. For instance, the system might reclassify a device from "neither" to "support device" if it begins providing crucial services to a target device during a failover scenario. Conversely, the system could downgrade a former target device to a support role or "neither" category if its importance in business operations diminishes. The system's dynamic role assignment ensures that vulnerability assessments and security prioritizations remain aligned with the current operational reality of the network, rather than relying on static, potentially outdated device classifications.

In an embodiment, the system determines and analyzes support devices that interact with the identified target devices (Operation 210). The system examines network communication logs and traffic patterns in real-time to identify devices that frequently interact with or provide services to the target devices. Exemplary support devices include load balancers, authentication servers, backup systems, or specialized tools that contribute to the functionality of target devices. The system assesses the nature and frequency of interactions between support devices and target devices, categorizing them based on their importance to the target device's operations. Furthermore, the system analyzes the configurations, patch levels, and security postures of these support devices to understand their potential impact on the overall security of the target devices. This comprehensive analysis enables the system to create a detailed map of dependencies and potential vulnerabilities within the network ecosystem.

In an embodiment, the system employs historical data and machine learning models to detect support devices correlated with target devices such as load balancers paired with critical web servers. Another example support device is a Picture Archiving and Communication System (PACS) server linked to CT scan machines.

In an embodiment, the system deploys a scoring algorithm to assess and rank potential support devices. The system assigns various interaction types different weights with data transfers, control commands, and authentication processes given particular consideration. An exemplary support score method is described below with respect to FIG. 2B.

In an embodiment, the system evaluates support devices with multiple criteria, including communication frequency, data transfer types, software update patterns, access log analysis, resource utilization trends, and compliance with audit requirements. In one example, the system factors in additional elements, such as redundancy mechanisms and scheduled audits. In one embodiment, the system integrates proximity factors into the evaluation process, recognizing that support devices often share network segments or security zones with the critical systems. The system analyses network topology and firewall configurations to identify devices with privileged access to critical systems, factoring this information into the overall support device ranking. The system monitors energy consumption patterns since support devices crucial to business operations often exhibit power usage profiles similar to supported target devices. In one example, the system adjusts aggregate scores for devices that are part of redundant systems or with backup mechanisms to account for reduced downtime impact. The system normalizes score to ensure comparability for prioritization purposes.

In an embodiment, the system monitors devices for frequent changes and patches that indicate operational importance by utilizing data from Configuration Management Database (CMDB) systems. The system examines access logs to identify devices handling sensitive data or possessing privileged access. The system determines devices with high resource usage patterns (that are heavily relied upon for business operations) and devices subject to frequent audits or strict compliance requirements. To further refine support device identification, the system observes idle and standby times, looking for similarities with critical server patterns. The system marks devices configured for redundancy or failover.

In an embodiment, the system uses a beam search algorithm that serves as a heuristic method for the system to identify the most crucial support devices. An exemplary beam search method is described below with respect to FIG. 3. The system constructs a hierarchical representation with target servers positioned at the top level and potential support devices arranged in subsequent levels. As the beam search navigates this structure, the system computes joint probabilities of various paths to determine those with the highest cumulative scores. The system designates support devices positioned nearest to target devices along these high-scoring paths as key support devices.

In an embodiment, the system determines whether or not to adjust the vulnerability score based on the support score and other info about the support devices (Operation 212). If the system decides to adjust the vulnerability score based on the support score, the system proceeds to operation 214 discussed below. If the system decides not to adjust the vulnerability score based on the support score, the system continues to monitor the network in operation 206.

In an embodiment, the system evaluates the calculated support scores in real-time, that represent the importance of support devices to the functionality of target devices. The system flags support devices with higher support scores for potential vulnerability score adjustment. In one example, the system considers additional factors, such as the device's position in the network hierarchy, its historical performance, and its role in critical business processes. Devices that serve multiple target devices or play crucial roles in data flow receive heightened scrutiny.

In an embodiment, the system incorporates contextual information to refine the vulnerability score adjustment decision. The system analyzes recent security incidents, emerging threat intelligence, and industry-specific risk factors. Devices operating in high-risk environments or those with a history of security breaches are given additional weight in the adjustment process. The system also considers the current patch status, configuration complexity, and lifecycle stage of support devices. These contextual factors help ensure that vulnerability score adjustments reflect both the device's support role and its individual risk profile.

In an embodiment, the system evaluates the calculated support scores against predetermined thresholds to identify devices that warrant special consideration in vulnerability assessment. Alternately, the system utilizes a ranking mechanism in conjunction with support scores to determine vulnerability score adjustments. The system ranks support devices based on their support scores and selects a top percentile for enhanced vulnerability assessment.

In an embodiment, the system utilizes machine learning models trained on historical network data to predict the potential impact of vulnerability score adjustments. The machine learning models analyze patterns in past security incidents, remediation actions, and their outcomes. By leveraging this predictive capability, the system anticipates the downstream effects of score adjustments on overall network resilience. The system adapts and modifies the machine learning model over time, improving the machine learning model accuracy as the system processes more data about the network's evolving security landscape.

In an embodiment, a system adjusts vulnerability scores of support devices (Operation 214). The system reevaluates in real-time the initial vulnerability scores assigned to support devices by incorporating their importance to target devices. Support devices with higher levels of interaction or critical roles in maintaining target device functionality receive increased weight in their vulnerability scores. The system factors in the potential impact on target devices if a support device were to be compromised, considering various aspects, such as data flow disruption, service interruption, or potential for lateral movement by attackers. Additionally, the system considers the proximity of support devices to target devices within the network topology, adjusting scores based on the case of potential exploit propagation. Through this comprehensive adjustment process, the system creates a more contextually relevant vulnerability assessment that reflects the true risk posture of the network environment.

In an embodiment, the system remediates based on the adjusted vulnerability scores (Operation 216). The system prioritizes remediation actions in real-time by focusing on support devices with the highest adjusted vulnerability scores, recognizing their amplified importance to the overall network security. The system tailors remediation actions to address the specific vulnerabilities identified, ranging from software patching and configuration changes to more complex security control implementations. The system generates a detailed remediation plan, outlining steps to mitigate risks associated with a high-priority support device. As part of the remediation process, the system monitors the implementation of security measures, tracking progress and effectiveness. The system also reevaluates the network environment post-remediation, adjusting vulnerability scores and priorities as necessary to reflect the improved security posture. This dynamic approach ensures that remediation actions remain aligned with the evolving threat landscape and the operational importance of support devices to target devices.

In an embodiment, the system operates in real-time, where real-time is defined as the system's ability to process and respond to input data or events as they occur, with minimal delay between the occurrence of an event and the system's reaction to it. The system's real-time operations ensure that the latency between data input, processing, and output is sufficiently low to meet the temporal requirements of the network environment and security demands. Real-time in this context means that the system's computations and decision-making processes occur within a timeframe that is perceived as immediate from the perspective of network operations and security response needs. The system's real-time capabilities allow it to provide up-to-the-second insights, alerts, and actions, enabling network administrators to respond to security threats and vulnerabilities as they emerge, rather than relying on periodic or delayed analysis.

In an embodiment, a system enhances the perceived importance of vulnerabilities detected on support devices that might otherwise be classified as medium or low risk. The system provides context for vulnerabilities based on a device's significance to core business operations, ensuring that potential security weaknesses in vital support infrastructure receive appropriate attention. By employing a contextual approach, the system enables more effective prioritization of vulnerability mitigation efforts across complex technological landscapes. The scoring mechanism incorporates real-time data analysis to capture the dynamic nature of IT environments. The system continuously evaluates communication patterns, data flows, and system interdependencies to adjust device rankings as conditions change. By providing context for vulnerabilities based on a device's significance to core business operations, the system ensures that potential security weaknesses in vital support infrastructure receive appropriate attention. The contextual approach enables more effective prioritization of vulnerability mitigation efforts across complex technological landscapes.

In an embodiment, the system utilizes LSA to identify target and/or support devices by analyzing various data sources, including patch management systems, configuration management databases, application logs, incident reports, third-party risk assessments, and cloud service provider logs. The system associates these data sources with devices and provides context to determine if a device is a target and/or support device. The system applies LSA to find similarities in textual information from the data sources. Initially proposed to identify business-critical machines, the system now focuses on support devices.

In an embodiment, the system applies LSA to various organizational data sources to determine vulnerability criticality and potential impact. The system includes numerous data sources, such as asset inventories, network diagrams, compliance documents, historical incident reports, user activity logs, application logs, configuration management databases, patch management systems, incident response reports, threat intelligence feeds, penetration testing results, vulnerability scanners, Security Information and Event Management systems, third-party risk assessments, cloud service provider logs, and employee training data. The system incorporates business impact analysis, regulatory compliance requirements, and stakeholder input to align prioritization with organizational business priorities and risk management strategies. The system facilitates comprehensive analysis to determine the criticality and potential impact of vulnerabilities within the organization's specific context and business environment.

In an embodiment, the system applies LSA to the metadata of devices to uncover hidden relationships and improve the management and analysis of large datasets. The system treats device metadata, such as specifications, operational parameters, logs, and usage patterns, as terms within a document matrix. In one embodiment, the document matrix is a term-device matrix, where documents are associated with devices in the network. The system decomposes the matrix using singular value decomposition (SVD), revealing latent semantic structures within the metadata and facilitating the identification of patterns and associations that are not immediately apparent. The system uses the application of LSA to device metadata to aid in clustering devices with similar characteristics, predicting device failures by identifying anomalous patterns in the metadata, and enhancing search and retrieval of device information by capturing the semantic similarity between different metadata attributes. The system thus optimizes device management, improves predictive maintenance, and enables more intelligent and efficient data retrieval and analysis in environments with a vast array of interconnected devices.

Figure 2B:
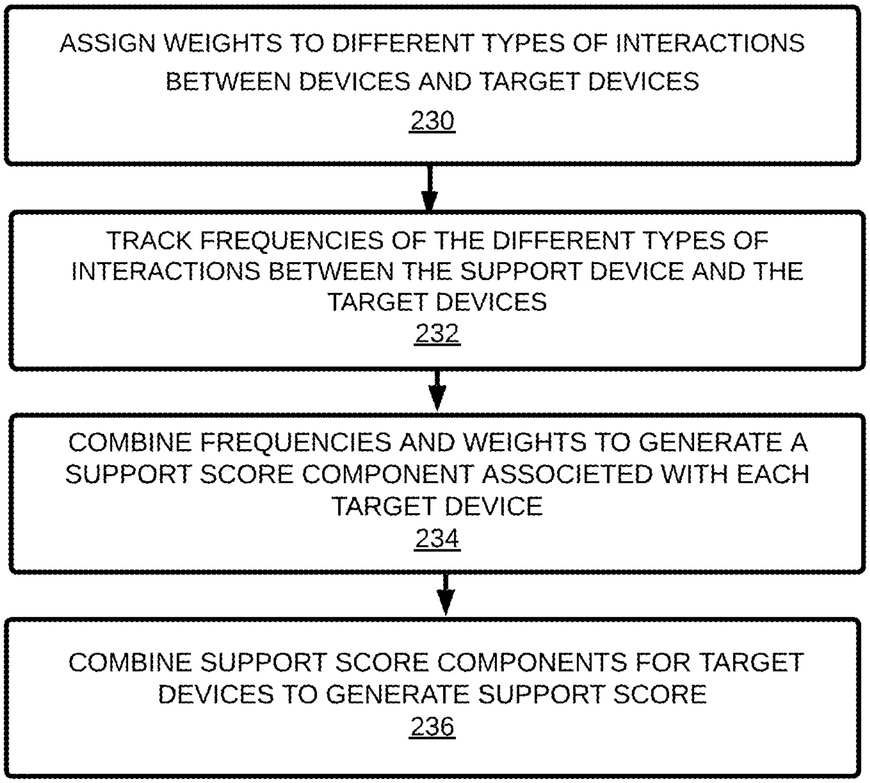
FIG. 2B illustrates an example set of operations for support score determination for a support device in accordance with one or more embodiments.

FIG. 2B illustrates an example set of operations for support score determination for a support device in accordance with one or more embodiments. Some of the example set of operations described below specifically describe a support score determination. However, a similar or modified set of operations may be executed for any risk support score determination. One or more operations illustrated in FIG. 2B may be modified, rearranged, or omitted. Accordingly, the particular sequence of operations illustrated in FIG. 2B should not be construed as limiting the scope of one or more embodiments.

In an embodiment, the system assigns weights to different types of interactions between devices and target devices (Operation 230). The system categorizes interactions based on their nature and importance, such as data transfer, control commands, or authentication requests. The system assigns higher weights to interactions deemed more critical to the functionality of target devices. This weighting system allows for a more nuanced evaluation of device relationships. For example, the system weights interactions, such as data transfers, control commands, and authentication requests differently. The system gives some communications, such as pings, low weight since these communications generally do not indicate a strong connection between the target device and potential support device. The system assigns heavier weights to control commands.

In an embodiment, the system employs a machine learning model to dynamically determine and adjust the weights assigned to different types of interactions. The system utilizes a supervised learning approach, where the system uses historical data on device interactions and their impact on system performance and security to train the model. The system analyzes patterns in the data to identify the types of interactions that are most indicative of critical relationships between devices.

In an embodiment, the system tracks frequencies of the different types of interactions between the support device and the target device (Operation 232). The system maintains a record of how often a type of interaction occurs over time. This frequency tracking provides a quantitative basis for the system to assess the intensity and consistency of relationships between support and target devices.

In an embodiment, the system combines frequencies and weights to generate a support score component (Operation 234). The system multiplies the frequency of interaction types by its assigned weight and sums these products in a Weighted Interaction Scoring (WIS) method. The resulting score component reflects both the volume and importance of interactions between a support device and a target device, providing a measure of the support device's contribution to the target device's functionality.

In an embodiment, the system combines support score components for target devices to generate the support score (Operation 236). The system aggregates the individual score components calculated for target devices that a support device interacts with. This aggregation produces a comprehensive support score that represents the total contribution of the support device to the functionality of target devices in the network. As discussed above, in some cases, the system incorporates additional criteria, such as the presence of failover systems and regular audits and/or other methods such as beam search into the scoring mechanism.

4. Network Graph for Beam Search

Figure 3:
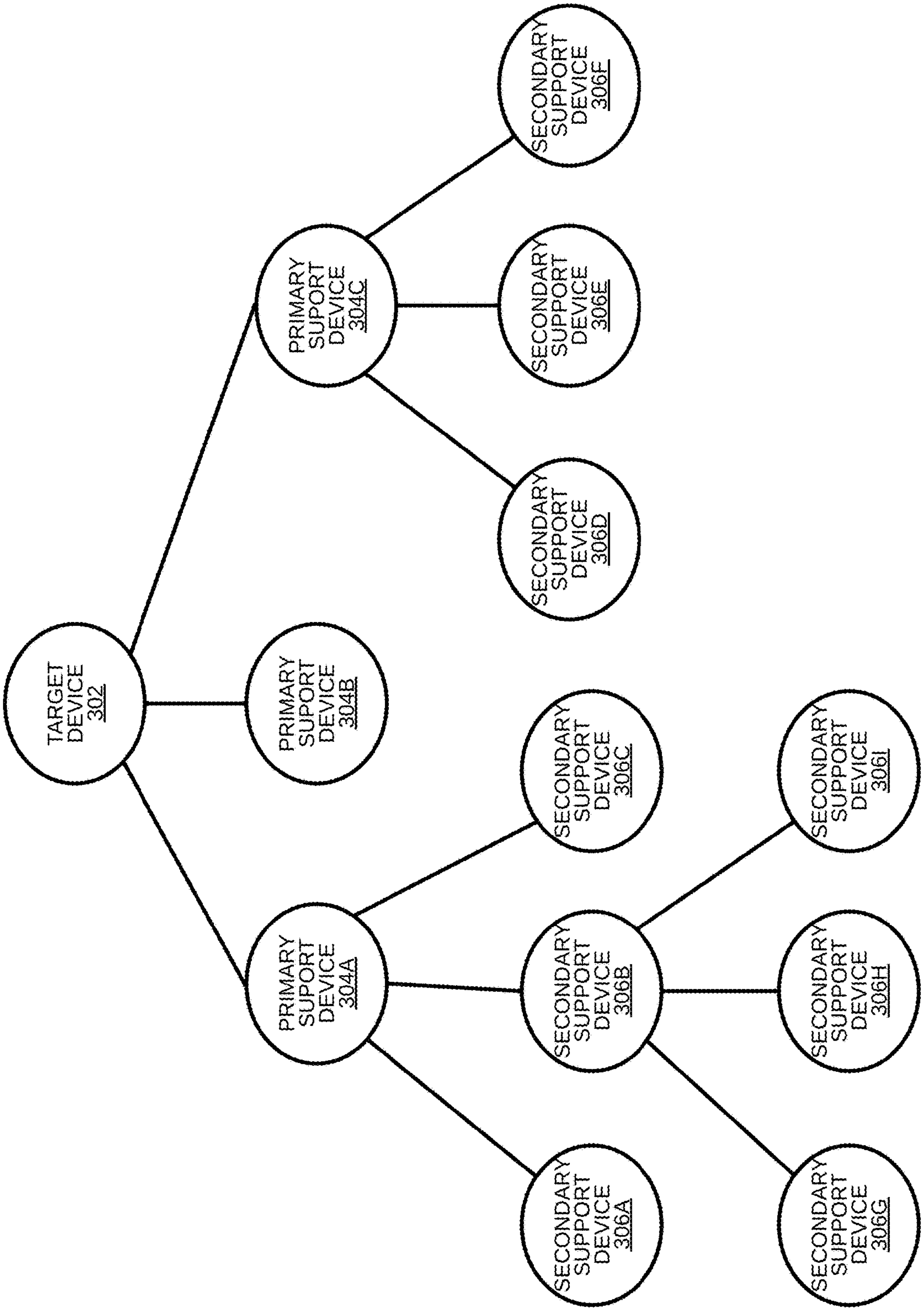
FIG. 3 illustrates an exemplary network graph for a beam search with respect to support devices in accordance with one or more embodiments.

FIG. 3 illustrates an exemplary network graph for a beam search with respect to support devices in accordance with one or more embodiments. The exemplary network graph of FIG. 3 includes target device 302, primary support devices 304A, 304B, 304C, and secondary support devices 306A, 306B, 306C, 306D, 306E, 306F, 306G, 306H, 306I.

FIG. 3 depicts a hierarchical tree structure with target device 302 representing a target device at the top. In one example, the top layer has multiple target devices at the top layer. Below the root node (target device 302), multiple branches extend downward, representing candidate support devices (such as primary support devices 304A, 304B, 304C, and secondary support devices 306A, 306B, 306C, 306D, 306E, 306F, 306G, 306H, 306I) and the device connections. Primary support devices 304A, 304B, 304C are direct child nodes of target device 302. Secondary support devices 306A, 306B, 306C, 306D, 306E, 306F, 306G, 306H, and 306I are indirect child nodes of target device 302. Secondary support devices 306A, 306B, 306C, 306D, 306E, and 306F are grandchild nodes and secondary support devices 306G, 306H, and 306I are great-grandchild nodes.

In an embodiment, nodes in the tree correspond to devices in the network, with edges between nodes indicating communication or dependency relationships. The beam search transversal includes paths traversing the tree, starting from a root node and exploring multiple branches simultaneously. The width of the beam indicates the top-k most promising device sequences being considered at the steps. Node scores associated with nodes reflect the importance of the device based on factors, such as interaction frequency and type. Using a beam search, the system prunes less promising paths and focuses on high-scoring branches, ultimately identifying the most critical support devices.

In an embodiment, the system assigns scores to support devices based on the WIS method describe above. The system initializes the beam with the highest-scoring support devices. As the search progresses, the system expands and prunes the beam, focusing on the most promising support device sequences. In an embodiment, the system generates a score for a support device based on a cumulative score of devices represented by direct and indirect child nodes of the particular node. The system generates the final beam containing the most important support devices, ranked by their support scores, that guides vulnerability management prioritization.

5. Practical Applications, Advantages, & Improvements

The system offers significant practical applications in enhancing network security and optimizing resource allocation for vulnerability management. By identifying target devices and monitoring their interactions with support devices, the system generates support scores that quantify the contribution of support devices to the functionality of target devices. The support scores enable prioritization of remediation actions, focusing security efforts on devices that have the most significant impact on critical systems. Such prioritization improves resource allocation and enhances overall network security. The system's approach represents a technological improvement over traditional vulnerability assessments by incorporating contextual importance of devices within the network ecosystem. Network administrators benefit from a more nuanced understanding of device relationships and dependencies, leading to more effective risk management strategies. By aligning security efforts with the operational importance of network components, organizations more effectively protect their crucial assets and optimize their security investments.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiment, and what is intended by the applicants to be the scope of the embodiment, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
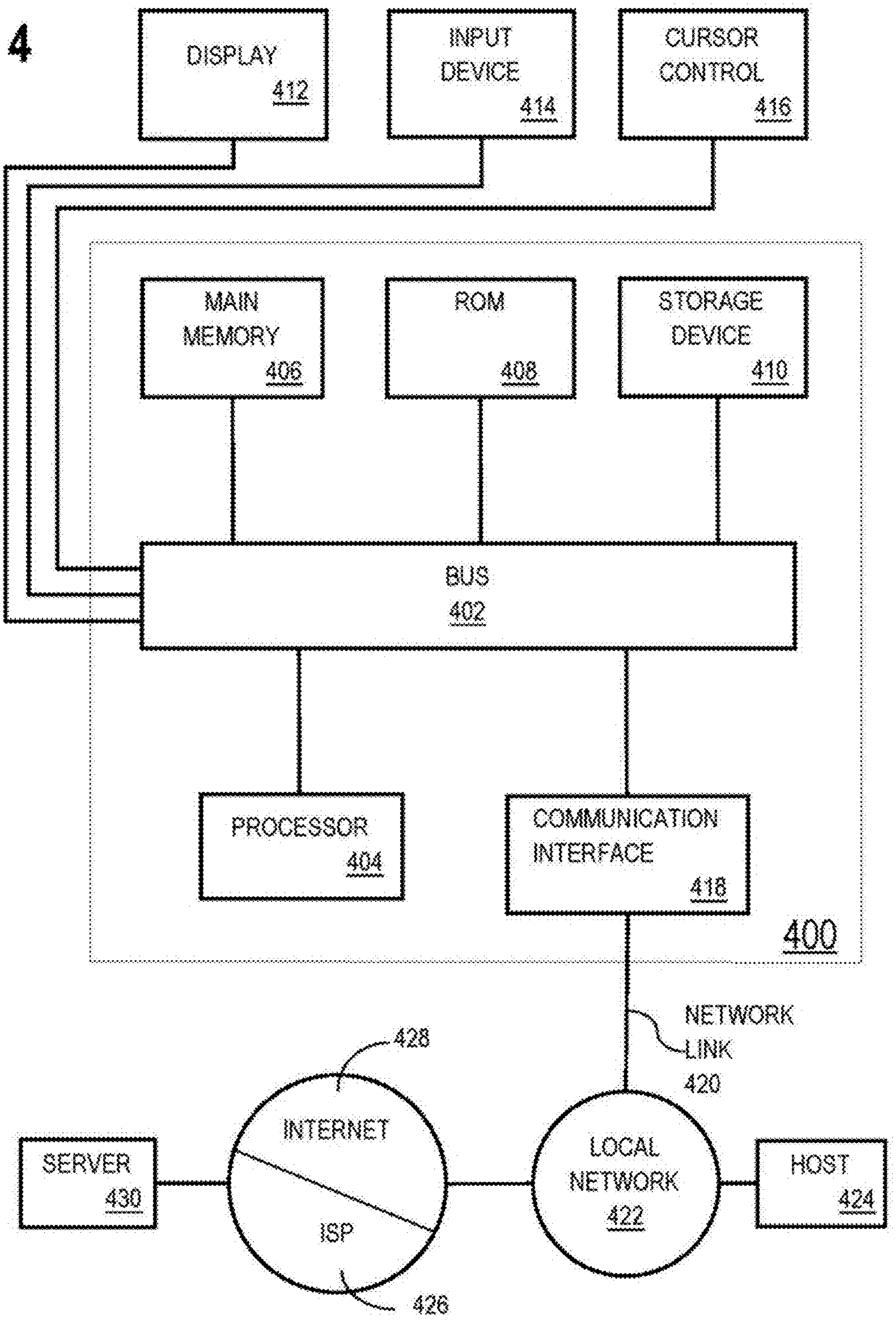
FIG. 4 illustrates a block diagram of a system in accordance with one or more embodiments.

For example, FIG. 4 is a block diagram that illustrates a computer system 400 upon which an embodiment of the embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the embodiment have been described with reference to numerous specific details that may vary from implementation to implementation. The specification and drawings are, accordingly, to be regarded in an illustrative rather than a restrictive sense. The sole and exclusive indicator of the scope of the embodiment, and what is intended by the applicants to be the scope of the embodiment, is the literal and equivalent scope of the set of claims that issue from this application, in the specific form in which such claims issue, including any subsequent correction.

What is claimed is:

1. A non-transitory computer readable medium comprising instruction that, when executed by one or more hardware processors, causes performance of operations comprising:

identifying a target device in a network as a key component to maintain in a functioning state;

responsive to identifying the target device as the key component to maintain in the functioning state: monitoring first interactions between a first support device and the target device and monitoring second interactions between a second support device and the target device;

based on the first interactions between the first support device and the target device, generating a first target device-specific support score for the first support device in relation to the target device, the first target device-specific support score representing a contribution of the first support device to functionality of the target device;

based on the second interactions between the second support device and the target device, generating a second target device-specific support score for the second support device in relation to the target device, the second target device-specific support score representing a contribution of the second support device to the functionality of the target device;

prioritizing remediation of the first support device over the second support device based at least in part on the first target device-specific support score and the second target device-specific support score indicating a greater contribution of the first support device to the functionality of the target device than the second support device; and remediating the first support device with a first remediation action.

2. The non-transitory computer readable medium of claim 1, wherein prioritizing the first remediation action based at least in part on the first target device-specific support score for the first support device comprises:

computing a vulnerability score for the first support device based at least in part on the first target device-specific support score for the first support device; and prioritizing the first remediation action based on the vulnerability score.

3. The non-transitory computer readable medium of claim 1, wherein the operations further comprise:

computing a vulnerability score for the first support device based at least in part on the first target device-specific support score for the first support device; and implementing a security policy for the first support device based on the vulnerability score.

4. The non-transitory computer readable medium of claim 1, wherein generating the first target device-specific support score comprises:

assigning weights to different interaction types of the first interactions between the first support device and the target device;

tracking frequencies of each subset of the first interactions, corresponding to respective interaction types, between the first support device and the target device; and determining the first target device-specific support score based on the weights and frequencies of each subset of the first interactions.

5. The non-transitory computer readable medium of claim 1, wherein the operations further comprise adjusting a vulnerability score for the first support device based on the first target device-specific support score, wherein prioritizing a remediation action corresponding to the first support device is based at least in part on the adjusted vulnerability score.

6. The non-transitory computer readable medium of claim 1, wherein the operations further comprise:

identifying a second target device in the network;

monitoring another set of interactions between the first support device and the second target device;

based on the other set of interactions between the first support device and the second target device, generating a third support score for the first support device, the third support score representing a contribution of the first support device to an operation of the second target device; and wherein the first remediation action is prioritized based further on the third support score.

7. The non-transitory computer readable medium of claim 1, further comprising:

constructing a hierarchical tree structure with a root node representing the target device;

representing a first set of candidate support devices that directly interact with the target device as a first set of nodes that are direct child nodes of the root node;

representing a second set of devices that indirectly interact with the target device as a second set of nodes that are direct or indirect child nodes of one of the first set of nodes; and scoring each of the first set of candidate support devices at least in part by performing a beam search traversal of the hierarchical tree structure.

8. The non-transitory computer readable medium of claim 7, wherein a score for a first candidate support device represented by a particular node of the first set of candidate support devices, is based on a cumulative score of devices represented by direct and indirect child nodes of the particular node.

9. The non-transitory computer readable medium of claim 1, further comprising applying latent semantic analysis to organizational data sources by:

associating devices in the network with terms in the organizational data sources;

constructing a term-device matrix;

applying singular value decomposition (SVD) of the term-device matrix;

determining underlying relationships among devices using the singular value decomposition; and using the determined underlying relationships to categorize a device as a target device or support device.

10. The non-transitory computer readable medium of claim 9, wherein the latent semantic analysis is applied to organizational data sources that include multiple types of a list of data sources including: asset inventories, network diagrams, compliance documents, historical incident reports, user activity logs, application logs, configuration management databases, patch management systems, incident response reports, threat intelligence feeds, penetration testing results, vulnerability scanners, Security Information and Event Management systems, third-party risk assessments, cloud service provider logs, and employee training data.

11. The non-transitory computer readable medium of claim 1, wherein producing the first target device-specific support score comprises comparing idle times of the first support device to the target device, wherein matching idle times increase the first target device-specific support score.

12. The non-transitory computer readable medium of claim 1, wherein producing the first target device-specific support score further comprises applying machine learning models to historical data to detect correlations between the first support device and the target device.

13. The non-transitory computer readable medium of claim 1, wherein the first interactions include data transfer, control commands, and authentication requests.

14. The non-transitory computer readable medium of claim 1, wherein producing the first target device-specific support score further comprises determining an importance of the first support device using at least one method of methods including:

assessing frequency of changes and patches applied to the first support device;

examining access logs of the first support device to determine if the first support device handles sensitive data or has privileged access;

identifying if the first support device has high resource usage patterns; and determining if the first support device is subject to frequent audits or strict compliance requirements.

15. A method comprising:

identifying a target device in a network as a key component to maintain in a functioning state;

responsive to identifying the target device as the key component to maintain in the functioning state: monitoring first interactions between a first support device and the target device and monitoring second interactions between a second support device and the target device;

based on the first interactions between the first support device and the target device, generating a first target device-specific support score for the first support device in relation to the target device, the first target device-specific support score representing a contribution of the first support device to functionality of the target device;

based on the second interactions between the second support device and the target device, generating a second target device-specific support score for the second support device in relation to the target device, the second target device-specific support score representing a contribution of the second support device to the functionality of the target device; and prioritizing remediation of the first support device over the second support device based at least in part on the first target device-specific support score and the second target device-specific support score and remediating the first support device with a first remediation action indicating a greater contribution of the first support device to the functionality of the target device than the second support device; and remediating the first support device with a first remediation action;

wherein the method is performed by at least one device including a hardware processor.

16. The method of claim 15, wherein prioritizing the first remediation action based at least in part on the first target device-specific support score for the first support device comprises:

computing a vulnerability score for the first support device based at least in part on the first target device-specific support score for the first support device; and prioritizing the first remediation action based on the vulnerability score.

17. The method of claim 15, further comprising:

computing a vulnerability score for the first support device based at least in part on the first target device-specific support score for the first support device; and implementing a security policy for the first support device based on the vulnerability score.

18. The method of claim 15, wherein generating the first target device-specific support score comprises:

assigning weights to different interaction types of the first interactions between the first support device and the target device;

tracking frequencies of each subset of the first interactions, corresponding to respective interaction types, between the first support device and the target device; and determining the first target device-specific support score based on the weights and frequencies of each subset of the first interactions.

19. A system comprising:

at least one device including a hardware processor;

the system being configured to perform operations comprising:

identifying a target device in a network as a key component to maintain in a functioning state;

responsive to identifying the target device as the key component to maintain in the functioning state: monitoring first interactions between a first support device and the target device and monitoring second interactions between a second support device and the target device;

based on the first interactions between the first support device and the target device, generating a first target device-specific support score for the first support device in relation to the target device, the first target device-specific support score representing a contribution of the first support device to functionality of the target device;

based on the second interactions between the second support device and the target device, generating a second target device-specific support score for the second support device in relation to the target device, the second target device-specific support score representing a contribution of the second support device to functionality of the target device; and prioritizing remediation of the first support device over the second support device based at least in part on the first target device-specific support score and the second target device-specific support score and remediating the first support device with a first remediation action indicating a greater contribution of the first support device to the functionality of the target device than the second support device; and remediating the first support device with a first remediation action.

20. The system of claim 19, wherein prioritizing the first remediation action based at least in part on the first target device-specific support score for the first support device comprises:

computing a vulnerability score for the first support device based at least in part on the first target device-specific support score for the first support device; and prioritizing the first remediation action based on the vulnerability score.

* * * * *